(12) United States Patent
Bradley et al.

(10) Patent No.: US 6,483,885 B1
(45) Date of Patent: Nov. 19, 2002

(54) FRAME SYNCHRONIZER

(75) Inventors: Wayne H. Bradley, West Chicago, IL (US); James L. Porter, Oklahoma City, OK (US)

(73) Assignee: PrairieComm, Inc., Arlington Heights, IL (US)

( * ) Notice: Subject to any disclaimer, the term of this patent is extended or adjusted under 35 U.S.C. 154(b) by 0 days.

(21) Appl. No.: 09/390,007

(22) Filed: Sep. 3, 1999

(51) Int. Cl.[7] .................................................. H04L 7/00
(52) U.S. Cl. ........................................................ 375/366
(58) Field of Search ................................. 375/365, 366, 375/362, 364, 371, 354

(56) References Cited

U.S. PATENT DOCUMENTS

| | | | |
|---|---|---|---|
| 4,829,543 A | 5/1989 | Borth et al. ................... 375/83 |
| 5,151,926 A | 9/1992 | Chennakeshu et al. ........ 375/84 |
| 5,177,740 A | 1/1993 | Toy et al. ................. 370/100.1 |
| 5,343,498 A | 8/1994 | Toy et al. ...................... 375/37 |
| 5,400,362 A | 3/1995 | Chennakeshu et al. ........ 375/58 |
| 5,402,450 A | 3/1995 | Lennen ........................ 375/343 |
| 5,570,370 A | 10/1996 | Lin ............................ 370/95.3 |
| 6,002,279 A | * 12/1999 | Schmidt ....................... 375/364 |
| 6,438,186 B1 | * 8/2002 | Strait .......................... 375/354 |

* cited by examiner

Primary Examiner—Don N. Vo
Assistant Examiner—Dung X. Nguyen
(74) Attorney, Agent, or Firm—Marshall, Gerstein & Borun

(57) ABSTRACT

A frame synchronizer for use in a receiver that receives an encoded signal from a transmitter includes a conjugation unit, a delay unit and multiplier coupled together to process the encoded signal. The multiplier multiplies either the received encoded signal by a conjugated, delayed version of the received encoded signal or multiplies a conjugated version of the received encoded signal by a delayed version of the received encoded signal to produce a first product signal. A further multiplier multiplies the first product signal with a locally-stored signal to generate a second product signal. An accumulator accumulates the second product signal over a plurality of bit times to generate an accumulated signal having a magnitude representing a time synchronization offset between the receiver and the transmitter and phase representing a frequency synchronization offset between the receiver and the transmitter. A synchronization correction unit generates a time offset correction and a frequency offset correction from the accumulated signal and these corrections are used to correct offsets between the receiver and the transmitter.

29 Claims, 1 Drawing Sheet

FRAME SYNCHRONIZER

TECHNICAL FIELD

The present invention relates generally to receivers and, more particularly, to a frame synchronizer for use in a digital receiver.

BACKGROUND ART

Communication systems employing digital transmitters and digital receivers are widely used. Such systems, which are commonly employed in mobile communication applications, such as mobile or car telephones, use digital modulation techniques such as binary phase shift keying (BPSK), differential binary phase shift keying (DPSK), quadrature phase shift keying (QPSK) or differential quadrature phase shift keying (DQPSK) and the like. Using these techniques, digital information is transmitted in bursts called frames, which are typically 20 milliseconds (ms) long. Frames have a number of sections or subsections that may range in size from 160 microseconds ($\mu$s) to 640 $\mu$s and that contain numerous digital symbols, which are transmitted approximately every 40 $\mu$s. As is known, digital symbols may be encoded to each represent a number of digital bits. Furthermore, each frame may include a preamble (midamble, etc.) bit sequence that is, for example, 14 bits or 560 $\mu$s in length and that is known by each receiver that is to receive the transmitted frame. Each frame also includes data sections having various bits or symbols that represent digitized audio. In some applications, the preamble may be used to address the frame to a particular receiver or receivers while the data sections include the encoded audio (or other) signal for that receiver. As will be appreciated by those familiar with the communication arts, not all of the information in every frame will be received error free because the fidelity of any particular communication system, while it may be high, is not perfect.

Mobile receivers, such as cellular telephones using, for example, time division multiple access (TDMA) standards like the IS-136 standard, are turned on and off on a regular basis and, thus, need to synchronize in both time and frequency to incoming signals to properly decode those signals. In some cases, mobile receivers decode the received signal to produce a bitstream and then perform an auto-correlation procedure on the decoded bitstream to recognize the location of the preamble, which may be designed to have a particularly recognizable auto-correlation function. In other cases, the receiver may perform a cross-correlation procedure between the incoming bitstream and a locally-stored and known preamble to detect the location of the preamble. Generally speaking, the step of decoding the received symbols is prone to error because of both timing and frequency offsets between the receiver and the transmitter. For example, a slight frequency offset between an RF unit of the receiver and an RF unit of the transmitter that transmitted the signal will cause decoding errors. Similarly, sample time offsets between the receiver and the transmitter may lead to the incorrect decoding of symbols, thereby producing erroneous bits in the bitstream.

Bit error rate (BER) is a well-known metric that is used to specify or quantify the fidelity of a digital communication system. BER is a comparison between bits sent over a channel by a digital transmitter and bits received from the channel by a digital receiver. If the received bits are identical to the sent bits, the BER is zero, thus indicating that the communications system including the communication channel, the digital transmitter and the digital receiver has perfect fidelity. Conversely, if the bits received are substantially different from the bits that were sent, the communication system has low fidelity. For example, if there is one bit error in 100 bits, the BER of a particular communication system is 0.01.

Digital communication systems are susceptible to various noise sources that decrease the fidelity of a communication system and, therefore, increase the BER of the communication system. Thermal noise (also called KT noise) is noise resulting from the temperature of various critical components in the digital communication system. Co-channel noise is noise caused by interference on the communication channel over which a digital transmitter is broadcasting. Of particular interest in mobile communication systems is multipath noise.

Multipath noise is noise caused by reception of delayed versions of a previously-received signal because energy from a digital transmitter may take more than one path to a digital receiver. For example, energy from a digital transmitter that takes the most direct path to the receiver arrives at the receiver first, while energy taking another path, such as one with one or more reflections from obstructions, the earth or the atmosphere, arrives at the digital receiver some relatively short time later. Energy that does not take the most direct path from the digital transmitter to the digital receiver is called multipath energy, or simply "multipath." In a mobile communications system, such as a cellular system, where either a digital receiver or a digital transmitter is moving, the communication path between a transmitter and receiver is constantly changing and, therefore, so is the multipath. For example, as a person using a cellular phone travels in his or her car, multipath may range from nonexistent at one geographic location, to extremely high at another geographic location. Because the multipath is always changing, it is difficult for a digital receiver in a mobile system to synchronize to a digital transmitter in both time and frequency. Typically in a digital system, time synchronization can only be achieved after frequency synchronization is achieved. Accordingly, prior approaches to time and frequency synchronization are relatively time consuming because the synchronization steps must be performed sequentially. A digital receiver such as may be found in a cellular telephone and the like, therefore, may have a significant time delay, due to synchronization operations between when a user attempts to use the receiver and when the receiver is synchronized and ready for use.

SUMMARY OF THE INVENTION

A synchronizer for use in a receiver that receives an encoded signal from a transmitter includes a conjugation unit, a delay unit and multiplier coupled together to process the encoded signal. The conjugation unit and the delay unit create both a conjugated version of the received encoded signal and a delayed version of the received encoded signal or create a single conjugated, delayed (e.g., conjugated and then delayed or delayed and then conjugated) version of the received encoded signal. The multiplier then multiplies either the received encoded signal and the conjugated delayed version of the received encoded signal or multiplies the conjugated version of the received encoded signal by the delayed version of the received encoded signal to produce a first product signal. A further multiplier multiplies the first product signal with a locally-stored signal to generate a second product signal. An accumulator accumulates the second product signal over a plurality of bit times to generate an accumulated signal that includes a time offset metric representative of a time synchronization offset between the receiver and the transmitter and that includes a frequency offset metric representative of a frequency synchronization offset between the receiver and the transmitter. A synchronization correction unit generates one or both of a time offset correction and a frequency offset correction from the time offset metric and the frequency offset metric. The receiver may use these corrections to correct offsets in the receiver.

The synchronizer may also or instead include a symbol extractor communicatively coupled to the first multiplier adapted to process the first product signal to generate a first digital bitstream and an exclusive OR (XOR) unit communicatively coupled to the symbol extractor that exclusive ORs the first digital bitstream with a locally-stored digital bitstream to produce an output signal. A second accumulator coupled to the XOR unit counts a number of differences between the first digital bitstream and the locally-stored digital bitstream based on the output signal to produce a second accumulated signal including a further time offset metric representative of the time synchronization offset between the receiver and the transmitter.

According to another aspect of the invention, a method of synchronizing a receiver to a transmitter that transmits an encoded signal spanning multiple bit times includes the steps of multiplying the encoded signal associated with a first bit time by a conjugate of the encoded signal associated with a second bit time to create a first product signal and multiplying the first product signal by a locally-stored signal to create a second product signal. The method also accumulates the second product signal over a plurality of bit times to generate an accumulated signal having a magnitude that corresponds to a time synchronization offset between the receiver and the transmitter and a phase that corresponds to a frequency synchronization offset between the receiver and the transmitter. If desired, the method may adjust the receiver based on at least one of the magnitude and the phase of the accumulated signal.

DESCRIPTION OF THE PREFERRED EMBODIMENT

Figure 1:
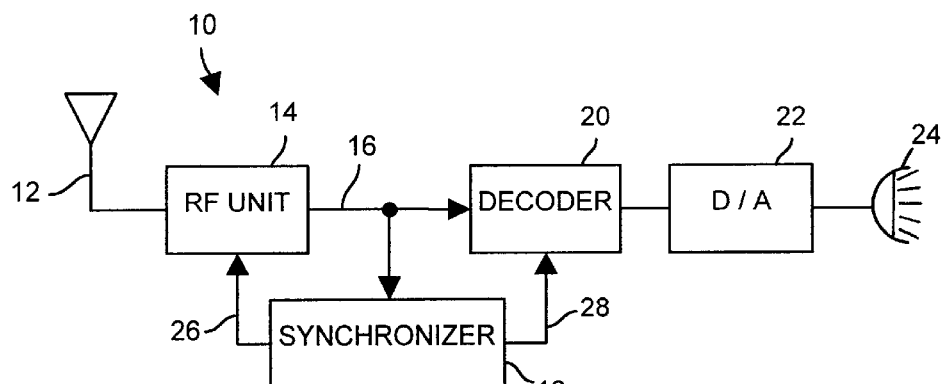
FIG. 1 is a block diagram of a digital receiver system.

Referring now to FIG. 1, a digital receiver system 10 associated with, for example, a cellular telephone includes an antenna 12 that receives a digitally-encoded signal modulated onto a carrier using, for example, differential modulation (e.g., DQPSK) and provides that signal to an RF unit 14. The RF unit 14 removes the carrier signal in any generally known manner, produces a baseband signal and provides the baseband signal, via a line 16, to a synchronizer 18 and a decoder 20. Generally speaking, the decoder 20 decodes the baseband signal by demodulating it using any appropriate demodulation technique, such as one that compares in-phase and quadrature signal components, to remove the modulation that was applied to the digital signal before transmission thereof. In the case of DQPSK modulation, the baseband signal contains phase changes between consecutive bit times to represent digital symbols and the decoder detects these phase changes and produces a bitstream based on the detected phase changes. The symbol rate of the bitstream may be, for example, 24.3 kilohertz (KHz) as it is in the IS-136 system. The bitstream may be further processed by performing any desired error correction and/or any other known or desired decoding techniques to eventually produce a digital signal representing speech (i.e., a digital speech signal). In a telephone system, the digital speech signal is provided to a digital-to-analog converter (D/A) 22, which converts the digital speech signal into an analog speech signal and delivers the analog speech signal to, for example, a speaker 24 in an earpiece of a cellular telephone. Generally speaking, the synchronizer 18, the decoder 20, and the D/A 22 may be implemented by suitable programming on a digital signal processor (DSP) or any other suitable processing hardware or hardware/software combination.

Of particular interest in FIG. 1 is the synchronizer 18 that receives the baseband signal from the RF unit 14 on the line 16 and ignores all but the portion of the baseband signal related to the preamble (the preamble baseband signal). The synchronizer 18 processes the preamble baseband signal to produce a number of communication metrics that are indicative of the time and frequency synchronization offsets between the receiver and a transmitter. The synchronizer 18 processes communication metrics to determine necessary timing and frequency synchronization corrections, outputs the frequency correction(s) on a line 26 to control, for example, an oscillator in the RF unit 18 and outputs timing corrections on a line 28 to control, for example, sampling times in the decoder 20. Frequency corrections may include, but are not limited to, tuning a phase locked loop (PLL) or a voltage controlled oscillator (VCO). Timing corrections may include advancing or retarding the timing of the decoder 20. As will be discussed in further detail with reference to FIG. 3, time and frequency synchronization offsets and corrections may be calculated simultaneously and, therefore, time and frequency synchronization may be achieved rapidly.

Figure 2:
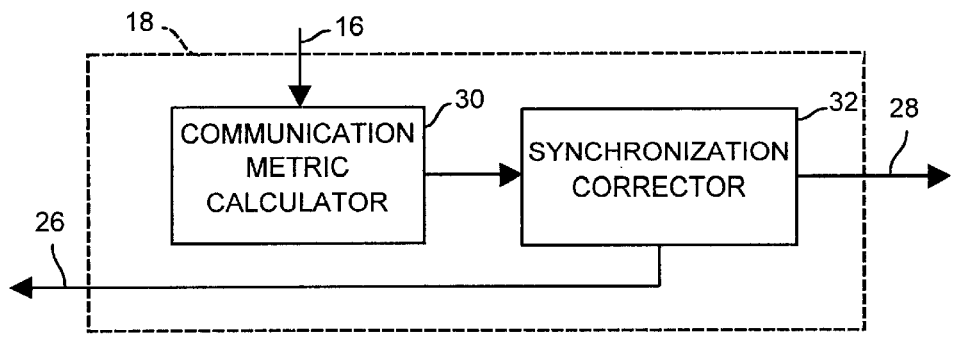
FIG. 2 is a block diagram of a synchronizer of the digital receiver system of FIG. 1.

As illustrated in FIG. 2, the synchronizer 18 includes a communication metric calculator 30 and a synchronization corrector 32. The communication metric calculator 30 receives preamble baseband signals from the RF unit 14 (FIG. 1) via the line 16 and processes these signals to generate a number of communication metrics, that may include, for example, a Hamming distance and/or a Euclidean distance (time offset metrics) and an average phase change metric (a frequency offset metric). The communication metric calculator 30 computes communication metrics using comparisons between a received preamble information and locally-stored preamble information and couples the communication metrics to the synchronization corrector 32. The synchronization corrector 32, which can be any desired or known synchronization correction unit that uses any known synchronization method or procedure, processes these metrics to determine frequency and timing corrections that need to be made in the RF unit 14 and in the decoder 20, respectively. Some communication metrics may be calculated before the preamble baseband signal provided on the line 16 is converted into digital bits, and some may be calculated after the preamble baseband signal is converted into bits.

Figure 3:
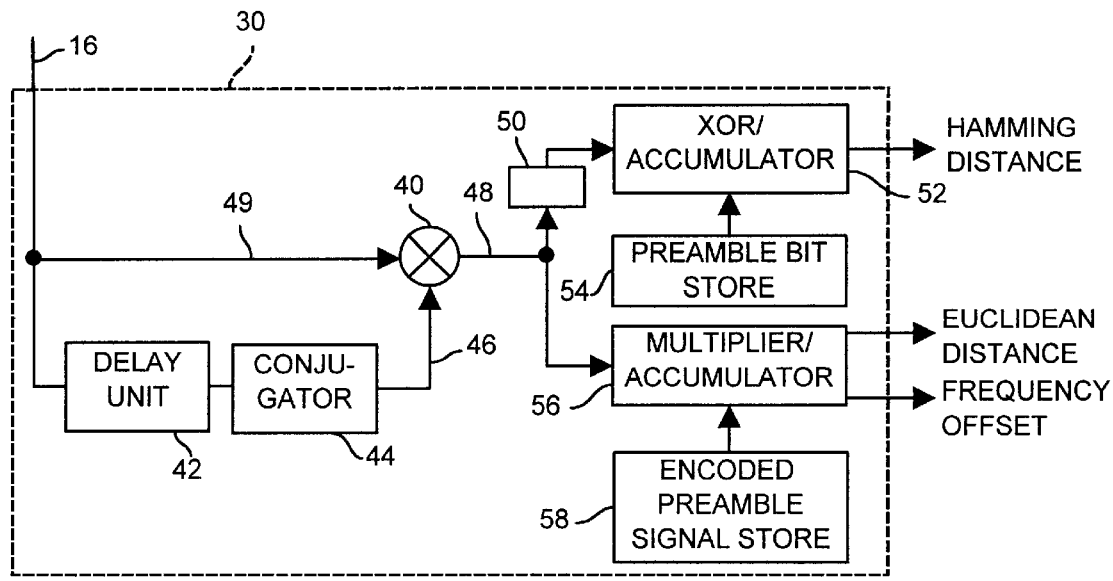
FIG. 3 is a block diagram of a communication metric calculator associated with the synchronizer of FIG. 2.

As shown in FIG. 3, the preamble baseband signal from the RF unit 14 (FIG. 1) is coupled to both a multiplier 40 and a delay unit 42 via the line 16. The delay unit 42 delays the preamble baseband signal by one bit time, which may be, for example, 41 ms, to create a delayed preamble baseband signal which, in turn, is coupled to a conjugator 44. The conjugator 44 generates the complex conjugate of the delayed preamble baseband signal, thereby creating a conjugated, delayed preamble baseband signal on a line 46, which is coupled to the multiplier 40. The multiplier 40 multiplies the conjugated, delayed preamble baseband signal and the preamble baseband signal and outputs a product signal on a line 48. Alternatively, the delay unit 42 or the conjugator 44 may be placed on the line 49 so that the delay unit 42 provides a delayed version of the signal on the line 16 to the multiplier 40 and the conjugator 44 provides a conjugated version of the signal on the line 16 to the multiplier 40. Still further, the conjugator 44 could be placed in front of the delay unit 42 instead of behind it as illustrated in FIG. 3. In any of these cases, the multiplier 40 produces a product signal on the line 48 that can be used as described herein to determine frequency and/or time offsets.

As will be appreciated by those skilled in the art, the delay unit 42, the conjugator 44 and the multiplier 40, when arranged as shown in FIG. 3 or in the manners described above, generate a product signal that is, essentially, a differentially decoded preamble baseband signal. The differentially decoded preamble baseband signal may be represented as shown in equation 1, wherein the R(n) and R(n−1) terms represent a received signal at a current bit time (n) and at a delayed bit time (n−1), respectively, the asterisk on the R(n−1) term denotes a complex conjugate operation and the ω term represents an unscaled tuning frequency offset between the receiver and the transmitter. As will be discussed in greater detail hereinafter, preamble symbols are chosen to have maximum correlation when time synchronized and zero correlation when unsynchronized in time. As a result, the $e^{j\omega}$ term is a phase term of the differentially decoded preamble baseband signal that, when scaled, represents the offset frequency between the receiver and the transmitter.

Differentially Decoded Preamble Baseband
Signal=$R(n)R(n-1)^*e^{j\omega}$           Equation 1

The differentially decoded preamble baseband signal from the multiplier 40 is coupled to a symbol extractor 50, which produces a decoded digital code or preamble bitstream corresponding to the phase differential between the current received signal R(n) and the received signal from the previous bit time R(n−1). The operation of the symbol extractor 50 is known in the art and may utilize a look-up table to find the appropriate digital code to output based on the phase change of the differentially decoded preamble baseband signal between two consecutive bit times. The bitstream from the symbol extractor 50 is coupled to an exclusive OR (XOR)/accumulator 52, which generates a Hamming distance communication metric.

Because the preamble is known, a locally-stored preamble is maintained in a preamble bit store 54 located in the synchronizer 18. The XOR/accumulator 52 compares the preamble bitstream from the symbol extractor 50 and the locally-stored preamble from the preamble bit store 54 by exclusive ORing these signals together. The accumulator portion of the unit 52 accumulates, or counts, the differences between the two bitstreams over the middle 12 bits of a 14 bit preamble. The differences between the bitstreams is the Hamming distance metric, which is output to the synchronization detector 32 (FIG. 2). In the instant case, the lower the Hamming distance, the better the receiver time synchronization.

The output from the multiplier 40 is also coupled to a multiplier/accumulator 56 that correlates the signal on the line 48 with locally-stored preamble information delivered by an encoded preamble signal store 58. The preamble signal store 58 may store differentially-encoded representations of the preamble for multiplication with the signal on the line 48 (which is still differentially encoded).

The multiplier/accumulator 56 multiplies the signal on the line 48 with the output signal from the encoded preamble signal store 58 to produce a second product signal. The accumulator portion of the unit 56 accumulates the product signal over the middle 12 bits of the 14 bit preamble to produce a correlation signal (Corr.) as represented by equation 2. P(n) is used herein to represent the differentially-encoded preamble signal for bit time n while P(n−1) is used to represent the differentially-encoded preamble signal for bit time n−1. The asterisk again denotes a complex conjugate operation. This conjugation operation may be performed by the unit 56 or the preamble signal store 58 may store the differentially-encoded preamble with the conjugate operation already performed.

$$Corr. = \sum_{n=1}^{12} R(n)R(n-1)^* e^{j\omega} P^*(n)P(n-1) \quad \text{Equation 2}$$

When the received preamble is time synchronized with the stored preamble signal, equation 2 reduces to the form $Me^{j\omega}$, where M is the magnitude of the correlation and ω is the unscaled frequency offset between the receiver and the transmitter represented as the phase of a signal having the magnitude M. Through the use of properly chosen preamble symbols or phase changes, the correlation of a received preamble and a locally-stored preamble that are offset by one bit time or more (e.g., R(n−1) and P*(n)) yields a correlation with a magnitude (M) of zero. Conversely, when using properly chosen preamble symbols or phase changes, the magnitude (M) of a correlation of a received preamble and a locally-stored preamble that are synchronized (e.g., R(n) and P*(n)) is maximal. Six examples of properly chosen phase changes as noted in the IS-136 specification are shown in table 1. As shown in table 1, each row represents a phase change in radians and each column represents a particular preamble that has the correlation properties noted above. While, these six preambles are specified by the IS-136 specification, other preambles having the appropriate correlation properties may be used in accordance with the present invention.

TABLE 1

|  | Preamble 1 | Preamble 2 | Preamble 3 | Preamble 4 | Preamble 5 | Preamble 6 |
| --- | --- | --- | --- | --- | --- | --- |
| Phase Change 1 | −π/4 | −π/4 | −3π/4 | π/4 | π/4 | −3π/4 |
| Phase Change 2 | −π/4 | −π/4 | π/4 | −3π/4 | 3π/4 | 3π/4 |
| Phase Change 3 | −π/4 | −π/4 | 3π/4 | 3π/4 | π/4 | −3π/4 |

TABLE 1-continued

|  | Preamble 1 | Preamble 2 | Preamble 3 | Preamble 4 | Preamble 5 | Preamble 6 |
|---|---|---|---|---|---|---|
| Phase Change 4 | 3π/4 | 3π/4 | −3π/4 | π/4 | −3π/4 | π/4 |
| Phase Change 5 | π/4 | −3π/4 | −3π/4 | π/4 | −3π/4 | π/4 |
| Phase Change 6 | 3π/4 | 3π/4 | −π/4 | −π/4 | −π/4 | −π/4 |
| Phase Change 7 | −3π/4 | π/4 | π/4 | −3π/4 | π/4 | −3π/4 |
| Phase Change 8 | 3π/4 | 3π/4 | −3π/4 | π/4 | −π/4 | −π/4 |
| Phase Change 9 | −3π/4 | π/4 | −3π/4 | π/4 | π/4 | −3π/4 |
| Phase Change 10 | −π/4 | −π/4 | π/4 | −3π/4 | −3π/4 | π/4 |
| Phase Change 11 | 3π/4 | 3π/4 | π/4 | −3π/4 | −3π/4 | π/4 |
| Phase Change 12 | π/4 | −3π/4 | π/4 | −3π/4 | 3π/4 | 3π/4 |
| Phase Change 13 | −π/4 | −π/4 | −3π/4 | π/4 | π/4 | −3π/4 |
| Phase Change 14 | −π/4 | −π/4 | π/4 | −3π/4 | 3π/4 | 3π/4 |

Partial bit time offsets between the received preamble and the locally-stored preamble yield a correlation having a magnitude (M) between zero and the maximal value. Accordingly, the magnitude (M) of the correlation is proportional to the time synchronization of the received preamble and the locally-stored preamble. Therefore, the magnitude (M) of the correlation is representative of the Euclidean distance of the received preamble and is output from the multiplier/accumulator 56 to the synchronization corrector 32. Similarly, ω, when scaled, is the frequency offset between the receiver and the transmitter and is, therefore, representative of the average phase change. This signal is also output from the multiplier/accumulator 56 to the synchronization corrector 32 for use in frequency correction. To scale the ω term, it must be multiplied by the symbol frequency, which in the IS-136 system is 24.3 KHz, and divided by 2π. The result of this scaling is the frequency offset between the receiver and the transmitter.

In many situations, multipath components affect the performance of a communication system. Specifically, a fraction of power from a signal that was received in a prior bit time may be received in a subsequent bit time due to different reflections or propagation paths. For example during bit time n, signals R(n) and αR(n−1), which represent information for the current bit time (n) and information from the previous time (n−1), may both be received, wherein α is a scale factor between 0 and 1. The synchronizer 18 and, in particular, the multiplier/accumulator 56, is capable of processing multipath components as shown in equation 3.

$$Corr. = \sum_{n=1}^{12} [\{R(n) + \alpha R((n-1)\}e^{j\omega n}$$
$$\{R(n-1) + \alpha R(n-2)\}^* e^{-j\omega(n-1)}] [P^*(n)P(n-1)]$$

Equation 3

When the summation specified in equation 3 is performed, the result is a single path correlation having three additional components that cancel one another out. Similar to equation 2, the correlation shown in equation 3 yields a result that may be represented by the form $Me^{j\omega}$, where M is the magnitude of the correlation and ω, when scaled, is the frequency offset between the receiver and the transmitter. As will be understood, the M and ω components are time offset and unscaled frequency offset metrics, respectively.

One or more of the Hamming distance, the Euclidean distance, and the average phase change metrics is coupled from the communication metric calculator 30 to the synchronization corrector 32. The synchronization corrector 32 processes the metrics in any known or desired manner and adjusts the RF unit 14 and the decoder 20 appropriately to synchronize frequency and/or timing in the receiver 10. For example, if the average phase change metric reveals that a frequency offset exists between the receiver and the transmitter, the synchronization corrector 32 will control the RF unit 14 to eliminate the offset via the line 26. Controls may include inputs to a phase locked loop (PLL) or a voltage controlled oscillator (VCO). If the Hamming distance is large and/or if the Euclidean distance (i.e., the magnitude of the correlation) indicates that the received and locally-stored preambles are not synchronized in time, the synchronization corrector 32 will control the decoder 20 to advance or retard the timing of the locally-stored preamble so that time synchronization may be achieved. If desired, the synchronization corrector 32 may correct the frequency offset first based on the output of the multiplier/accumulator 56 and then use one or both of the Hamming distance and the Euclidean distance metric to correct timing offsets, as the frequency offset metric is fairly insensitive to timing offsets while the timing metrics tend to be more sensitive to frequency offsets. In another case, it may be desirable to choose the Hamming distance metric if the frequency offset is low while it is desirable to choose the Euclidean distance metric if the frequency offset is high. The communication metric calculator 30 may make this determination by comparing the frequency offset metric to a predetermined set point or value and output either the Hamming metric or the Euclidean metric based on the comparison.

The disclosed system enables rapid time and frequency synchronization because the system simultaneously calculates communication metrics representing time and frequency offsets and corrections to the offsets and, in one case, does so before symbol decoding is performed. Rapid synchronization of both time and frequency may reduce the delay that a user experiences between the time when he or she attempts to use the receiver and when the receiver is synchronized and ready for use.

While frame synchronization techniques have been described herein for a TDMA audio system having a 14-bit preamble, they could be used in other types of systems, such as in CDMA (code division multiple access) systems, in video and data systems, and in systems having a preamble (midamble or other amble portion) that is more or less then 14 bits in length. It will be understood, in these systems, that the processing and accumulation described herein occurs on the middle bits (such as the middle 12 bits of a 14 bit preamble) of these systems.

Furthermore, while the frame synchronization techniques described herein are preferably implemented in software or are hard coded into a memory associated with, for example, a logic device such as an application specific integrated circuit, a programmable logic unit or a microprocessor, these techniques may alternatively or additionally be implemented in other hardware, firmware, etc. as desired. Moreover, the frame synchronization routines described herein may be stored in any computer readable memory such as on a magnetic disk, a laser disk, or other storage medium, in a RAM or ROM, etc. Likewise, these routines may be delivered to a user or a device via any known or desired delivery method including, for example, over a communication channel such as a telephone line, the Internet, on a transportable medium, such as a computer-readable disk, etc.

Numerous modifications and alternative embodiments of the invention will be apparent to those skilled in the art in view of the foregoing description.

Accordingly, this description is to be construed as illustrative only and not as limiting to the scope of the invention. The details of the structure may be varied substantially without departing from the spirit of the invention, and the exclusive use of all modifications, which are within the scope of the appended claims, is reserved.

It is claimed:

1. A synchronizer for use in a receiver that receives an encoded signal from a transmitter, the synchronizer comprising:
   a conjugation unit and a delay unit that are coupled to process the received encoded signal to produce either (1) both a conjugated version of the received encoded signal and a delayed version of the received encoded signal or (2) a conjugated, delayed version of the received encoded signal;
   a first multiplier adapted to multiply either (1) the received encoded signal by the conjugated, delayed version of the received encoded signal or (2) the conjugated version of the received encoded signal by the delayed version of the received encoded signal, to produce a first product signal;
   a second multiplier communicatively coupled to the first multiplier adapted to multiply the first product signal with a locally-stored signal to generate a second product signal;
   an accumulator adapted to accumulate the second product signal over a plurality of bit times to generate an accumulated signal; wherein the accumulated signal includes a time offset metric representative of a time synchronization offset between the receiver and the transmitter and includes a frequency offset metric representative of a frequency synchronization offset between the receiver and the transmitter; and
   a synchronization correction unit communicatively coupled to the accumulator adapted to generate at least one of a time offset correction or a frequency offset correction from the time offset metric or the frequency offset metric.

2. The synchronizer of claim 1, wherein the encoded signal includes a plurality of frames each having an amble portion and wherein each of the received encoded signal, the conjugated, delayed version of the received encoded signal, the conjugated version of the received encoded signal and the delayed version of the received encoded signal that is provided to the multiplier is associated with the amble portion of one of the plurality of frames.

3. The synchronizer of claim 2, wherein the amble portion comprises a preamble.

4. The synchronizer of claim 1, wherein the delay unit provides a one bit time delay.

5. The synchronizer of claim 1, wherein the accumulator accumulates the second product signal over twelve bit times.

6. The synchronizer of claim 1, further comprising:
   a symbol extractor communicatively coupled to the first multiplier which is adapted to process the first product signal to generate a first digital bitstream;
   an exclusive OR (XOR) unit communicatively coupled to the symbol extractor that exclusive ORs the first digital bitstream with a locally-stored digital bitstream to produce an output signal; and
   a second accumulator coupled to the XOR unit that counts a number of differences between the first digital bitstream and the locally-stored digital bitstream based on the output signal to produce a second accumulated signal including a further time offset metric representative of the time synchronization offset between the receiver and the transmitter.

7. The synchronizer of claim 6, wherein the encoded signal includes a plurality of frames each having an amble portion and wherein the first digital bitstream and the locally-stored digital bitstream each represent bits in the amble portion.

8. The synchronizer of claim 7, wherein the first digital bitstream comprises fourteen bits.

9. The synchronizer of claim 8, wherein the locally-stored digital bitstream comprises fourteen bits.

10. The synchronizer of claim 6, wherein the accumulator compares the first digital bitstream to the locally-stored digital bitstream over twelve bits.

11. A synchronizer for use in a receiver that receives an encoded signal from a transmitter, the synchronizer comprising:
    a conjugation unit and a delay unit that are connected so as to process the received encoded signal to produce either (1) both a conjugated version of the received encoded signal and a delayed version of the received encoded signal or (2) a conjugated, delayed version of the received encoded signal;
    a multiplier adapted to multiply either (1) the received encoded signal by the conjugated, delayed version of the received encoded signal or (2) the conjugated version of the received encoded signal by the delayed version of the received encoded signal, to produce a product signal;
    a symbol extractor communicatively coupled to the multiplier and adapted to process the product signal to generate a first digital bitstream;
    an exclusive OR (XOR) unit communicatively coupled to the symbol extractor that exclusive ORs the first digital bitstream with a locally-stored digital bitstream to produce an output signal;
    an accumulator coupled to the XOR unit that counts a number of differences between the first digital bitstream and the locally-stored digital bitstream from the output signal to produce an accumulated signal including a time offset metric representative of a time synchronization offset between the receiver and the transmitter.

12. The synchronizer of claim 11, wherein the encoded signal includes a plurality of frames each having an amble portion and wherein the first digital bitstream and the locally-stored digital bitstream each represent bits in the amble portion.

13. The synchronizer of claim 11, wherein the first digital bitstream comprises fourteen bits and the locally-stored digital bitstream comprises fourteen bits.

14. A method of synchronizing a receiver to a transmitter that transmits an encoded signal which spans multiple bit times, the method comprising the steps of:
 receiving the encoded signal;
 multiplying the encoded signal associated with a first bit time by a conjugate of the encoded signal associated with a second bit time to create a first product signal;
 multiplying the first product signal by a locally-stored signal to create a second product signal;
 accumulating the second product signal over a plurality of bit times to generate an accumulated signal having a magnitude that corresponds to a time synchronization offset between the receiver and the transmitter and a phase that corresponds to a frequency synchronization offset between the receiver and the transmitter; and
 adjusting the receiver based on at least one of the magnitude or the phase of the accumulated signal.

15. The method of claim 14, further comprising the steps of:
 processing the first product signal to generate a first digital bitstream;
 comparing the first digital bitstream to a locally-stored digital bitstream; and
 counting the number of differences between the first digital bitstream and the locally-stored digital bitstream to produce a further signal representing a further time synchronization offset between the receiver and the transmitter.

16. The method of claim 15, wherein each of the first digital bitstream and the locally-stored digital bitstream comprises fourteen bits.

17. The method of claim 14, wherein the encoded signal includes a plurality of frames each having an amble portion and wherein the encoded signal associated with the first bit time and the encoded signal associated with the second bit time are selected from the amble portion of one of the plurality of frames.

18. The method of claim 17, wherein the first bit time and the second bit time are consecutive bit times.

19. The method of claim 18, wherein the step of accumulating the second product signal over a plurality of bit times includes the step of accumulating the second product signal over twelve bit times.

20. A synchronizer for use in a receiver that has a processor and that receives an encoded signal from a transmitter, the synchronizer comprising:
 a memory;
 instructions stored in the memory and adapted for execution on the processor, wherein execution of the instructions causes the processor to perform the steps of:
  multiplying the encoded signal associated with a first bit time by a conjugate of the encoded signal associated with a second bit time to create a first product signal;
  multiplying the first product signal by a locally-stored signal to create a second product signal;
  accumulating the second product signal over a plurality of bit times to generate an accumulated signal having a magnitude that corresponds to a time synchronization offset between the receiver and the transmitter and a phase that corresponds to a frequency synchronization offset between the receiver and the transmitter; and
  adjusting the receiver based on at least one of the magnitude and the phase of the accumulated signal.

21. The synchronizer of claim 20, wherein the instructions further perform the steps of:
 converting the first product signal into a first digital bitstream;
 comparing the first digital bitstream to a locally-stored digital bitstream to determine differences between the first digital bitstream and the locally-stored digital bitstream; and
 accumulating a number differences over a number of bits to produce a signal representing a further time synchronization offset between the receiver and the transmitter.

22. The synchronizer of claim 20, wherein the first bit time and the second bit time are consecutive bit times.

23. The synchronizer of claim 20, wherein the step of accumulating the second product signal over a plurality of bit times includes the step of accumulating the second product signal over twelve bit times.

24. A synchronizer for synchronizing a receiver to a transmitter when the receiver receives an encoded signal from the transmitter, the synchronizer comprising:
 a logic device adapted to perform the steps of:
  multiplying the encoded signal associated with a first bit time by a conjugate of the encoded signal associated with a second bit time to create a first product signal;
  multiplying the first product signal by a locally-stored signal to create a second product signal;
  accumulating the second product signal over a plurality of bit times to generate an accumulated signal having a magnitude that corresponds to a time synchronization offset between the receiver and the transmitter and a phase that corresponds to a frequency synchronization offset between the receiver and the transmitter; and
  adjusting the receiver based on at least one of the magnitude and the phase of the accumulated signal.

25. The synchronizer of claim 24, wherein the logic device is further adapted to perform the steps of:
 converting the first product signal into a first digital bitstream;
 comparing the first digital bitstream to a locally-stored digital bitstream to determine differences between the first digital bitstream and the locally-stored digital bitstream; and
 accumulating a number of differences between the first digital bitstream and the locally-stored digital bitstream over a number of bits to produce a further signal representative of the time synchronization offset between the receiver and the transmitter.

26. The synchronizer of claim 24, wherein the first bit time and the second bit time are consecutive bit times.

27. The synchronizer of claim 24, wherein the plurality of bit times over which the second product signal is accumulated comprises twelve bit times.

28. A synchronizer for synchronizing a receiver to a transmitter when the receiver receives an encoded signal from the transmitter, the synchronizer comprising:

a logic device adapted to perform the steps of:

multiplying the encoded signal associated with a first bit time by a conjugate of the encoded signal associated with a second bit time to create a first product signal;

converting the first product signal into a first digital bitstream;

comparing the first digital bitstream to a locally-stored digital bitstream to determine differences between the first digital bitstream and the locally-stored digital bitstream; and accumulating a number differences between the first digital bitstream and the locally-stored digital bitstream over a number of bits to produce a signal representative of a time synchronization offset between the receiver and the transmitter.

29. The synchronizer of claim 28, wherein the logic device is further adapted to perform the step of adjusting the receiver based on the signal representative of the time synchronization offset between the receiver and the transmitter.

* * * * *